（12）United States Patent
Suh et al.

(10) Patent No.: US 9,277,387 B2
(45) Date of Patent: *Mar. 1, 2016

(54) METHOD AND SYSTEM FOR SUPPORTING EMERGENCY CALL USING NON-ACCESS STRATUM PROTOCOL IN MOBILE TELECOMMUNICATION SYSTEM (71) Applicant: Samsung Electronics Co., Ltd., Suwon-si, Gyeonggi-do (KR)

(72) Inventors: Kyung Joo Suh, Seoul (KR); Song Yean Cho, Seoul (KR); Beom Sik Bae, Suwon-si (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,078

(22) Filed: Oct. 6, 2014

(65) Prior Publication Data

US 2015/0065080 A1 Mar. 5, 2015

Related U.S. Application Data (63) Continuation of application No. 13/264,868, filed as application No. PCT/KR2010/002394 on Apr. 16, 2010, now Pat. No. 8,855,594.

(30) Foreign Application Priority Data

Apr. 17, 2009 (KR) .................. 10-2009-0033899

(51) Int. Cl.
*H04M 11/04* (2006.01)
*H04W 4/22* (2009.01)
*H04W 76/00* (2009.01)
*H04W 60/04* (2009.01)
*H04W 88/00* (2009.01)
*H04W 88/02* (2009.01)

(52) U.S. Cl.
CPC .............. *H04W 4/22* (2013.01); *H04W 60/04* (2013.01); *H04W 76/007* (2013.01); *H04W 88/005* (2013.01); *H04W 88/02* (2013.01)

(58) Field of Classification Search
CPC ..... H04W 4/22; H04W 76/007; H04W 76/02; H04W 60/00; H04W 76/022; H04W 76/027; H04W 72/04; H04W 72/042; H04W 2242/04; H04W 2207/18
USPC .............. 455/404.1, 435.1, 410, 411, 422.1; 370/259, 310, 328, 329, 352–356; 379/37, 45, 46
See application file for complete search history.

(56) References Cited

U.S. PATENT DOCUMENTS

| 7,787,855 | B2 | 8/2010 | Zhao et al. |
| 8,023,944 | B2 | 9/2011 | Huang |
| 8,094,620 | B2 | 1/2012 | Diachina et al. |
| 8,185,107 | B2 | 5/2012 | Faccin |
| 8,855,594 | B2 * | 10/2014 | Suh ............... H04W 76/007 370/259 |
| 2003/0033522 | A1 | 2/2003 | Bilgic et al. |
| 2005/0090224 | A1 | 4/2005 | Dorsey et al. |
| 2009/0310758 | A1 | 12/2009 | Tuohino et al. |
| 2010/0266107 | A1 | 10/2010 | Brusilovsky et al. |

FOREIGN PATENT DOCUMENTS

EP  2 001 253 A1  12/2008

* cited by examiner

*Primary Examiner* — Olumide T Ajibade Akonai
(74) *Attorney, Agent, or Firm* — Jefferson IP Law, LLP (57) ABSTRACT The present invention relates to a method and a system for managing an emergency call between a terminal and a network by using a non-access stratum protocol in a mobile communication network. A method for providing an emergency call service by a terminal in accordance with one embodiment of the present invention comprises the steps of: enabling the terminal to transmit an access request message including an emergency call identifier to a mobility management entity; enabling the terminal to attempt to authenticate the mobility management entity after the step of transmitting the access request message; enabling the terminal to receive an access grant message including the emergency call identifier from the mobility management entity; and enabling the terminal which receives the access grant message, to provide an emergency call service through the mobility management entity. According to one embodiment of the present invention, the emergency call is enabled.

16 Claims, 8 Drawing Sheets

METHOD AND SYSTEM FOR SUPPORTING EMERGENCY CALL USING NON-ACCESS STRATUM PROTOCOL IN MOBILE TELECOMMUNICATION SYSTEM

CROSS-REFERENCE TO RELATED APPLICATION(S)

This application is a continuation of U.S. application Ser. No. 13/264,868, filed on Dec. 23, 2011, which was the National Stage of International application No. PCT/KR2010/002394, filed on Apr. 16, 2010, which claimed the benefit of a Korean patent application filed on Apr. 17, 2009 in the Korean Intellectual Property Office and assigned Serial number 10-2009-0033899, the entire disclosure of each of which is hereby incorporated by reference.

TECHNICAL FIELD

The present invention relates to a mobile communication system and, in particular, to a method and system for supporting emergency call service efficiently on the basis of Non-Access Stratum (NAS) protocol between terminal and network.

BACKGROUND

Typically, the 3rd Generation Partnership Project (3GPP), as one of the representative standardization organizations, has specified Evolved Packet System (EPS) with the introduction of Mobility Management Entity (MME) for managing mobility.

In such evolved mobile communication system, the NAS protocol used in the conventional 3G mobile communication system is employed as modified to meet the requirements for the next generation high speed packet communication service.

Meanwhile, IP multimedia Subsystem (IMS) is a framework for supporting Internet Protocol Multimedia service in which the fixed and mobile communication networks supporting the providing public communication services using different circuit or socket switches are integrated by means of the Session Initiation Protocol (SIP) as the protocol for use in IP technology and Internet telephony and has been standardized by 3GPP represented by W-CDMA and 3GPP2 represented by CDMA-2000. This technology is referred to as IMS in 3GPP as W-CDMA camp while referred to as Multimedia Domain (MMD) in 3GPP2 as CDMA2000 camp. IMS is advantageous in that the voice call service, as well as web browsing and e-mail services, can be controlled in the packet service domain with SIP as higher protocol. In spite of the mature standardization of IMS, the service launch is delayed because the bearer setup and call setup for IMS are not supported.

Since EPS is designed to support the packet switched (PS) services, in order to enable provisioning of the voice call service widely, it is necessary to fall back to a CS network according Circuit Switched Fall Back (CS fall back or CSFB) or, if the IMS service is supported, perform handover from 3GPP EPS to 3GPP2 CDMA200 1x or 3GPP UTRAN/GERAN In such a situation. Along with this situation, the discussion is under way about the emergency call service. However, the detailed procedure and properties for supporting the emergency call service, e.g. how to provide the unauthenticated terminal with the emergency call service and how to release the connection to the unauthenticated terminal after the end of the emergency call, is not defined yet. There is therefore a need of a method and system element for supporting emergency call service efficiently.

SUMMARY

Problem to be Solved

The present invention provides a method and apparatus for supporting the emergency call service immediately without delay with NAS message exchange between the User Equipment (UE) and MME in the mobile communication such as 3GPP EPS supporting NAS protocol.

Also, the present invention provides a method for providing emergency call service to the UE supporting NAS even when roaming to different radio access technology, i.e. heterogeneous radio access network by specifying the operations related to the emergency call process with the NAS protocol message exchange between the UE and MME in handover situation.

Means for Solving the Problem

In accordance with an aspect of the present invention, a method for providing emergency call service at a terminal includes transmitting an attach request message having an emergency call indicator from the terminal to a Mobility Management Entity (MME); requesting authentication to the MME after the transmission of the attach request message; receiving an attach accept message including the emergency call indicator from the MME; and providing the emergency call service through the MME after the receipt of the attach accept message.

In accordance with another aspect of the present invention, a method for providing an emergency call service at a Mobility Management Entity (MME) includes attempting, when an attach request message including an emergency call indicator is received from a terminal, authentication on the terminal; transmitting an attach accept message including the emergency call indicator to the terminal; and providing the emergency call service to the terminal received the attach accept message.

In accordance with still another aspect of the present invention, a system for providing an emergency call service includes a terminal which transmits an attach request message having an emergency call indicator to a Mobility Management Entity (MME), requests authentication to the MME after the transmission of the attach request message, and provides the emergency call service through the MME after the receipt of the attach accept message upon receipt of an attach accept message including the emergency call indicator from the MME; and an MME which attempts, when the attach request message including the emergency call indicator is received from the terminal, authentication on the terminal, transmits an attach accept message including the emergency call indicator to the terminal, and provides the emergency call service to the terminal received the attach accept message.

Advantageous Effects

In the present invention implemented to operate as above, the effects expected by the representative features of the present invention are described hereinafter.

The terminal according to the present invention is capable of executing the emergency call in the 3GPP Evolved Packet System (EPS) network for supporting the next generation communication even when the terminal is not authenticated, capable of providing the normal service after the termination of the emergency call, and capable of providing the emergency call made in the middle of the normal service, thereby providing the normal call and emergency call services efficiently.

Also, the present invention relates to the method and system for providing the emergency call using the Non-Access Stratum (NAS) protocol, and the method for managing the registration management (attach and detach management), mobility management, and bearer management according to the present invention is implemented with the terminal (hereinafter, referred to as UE) and the mobility management entity (hereinafter, referred to as MME) such that, when the UE performs handover in active mode or attempts registration with the network, it is possible to process the emergency call more efficiently using NAS message in the network such as 3GPP EPS network through the bearer setup and state management of the UE and MME.

DETAILED DESCRIPTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. Furthermore, terms used herein are defined by taking functions in the present invention into account and can be changed according to the intentions of the users or operators or practice.

The subject matter of the present invention is a method for supporting the emergency call service in the mobile communication system using the NAS protocol between UE and MME. Although the description is directed to the 3GPP EPS system, the present invention can be applied to other mobile communication systems using NAS protocol.

Figure 1:
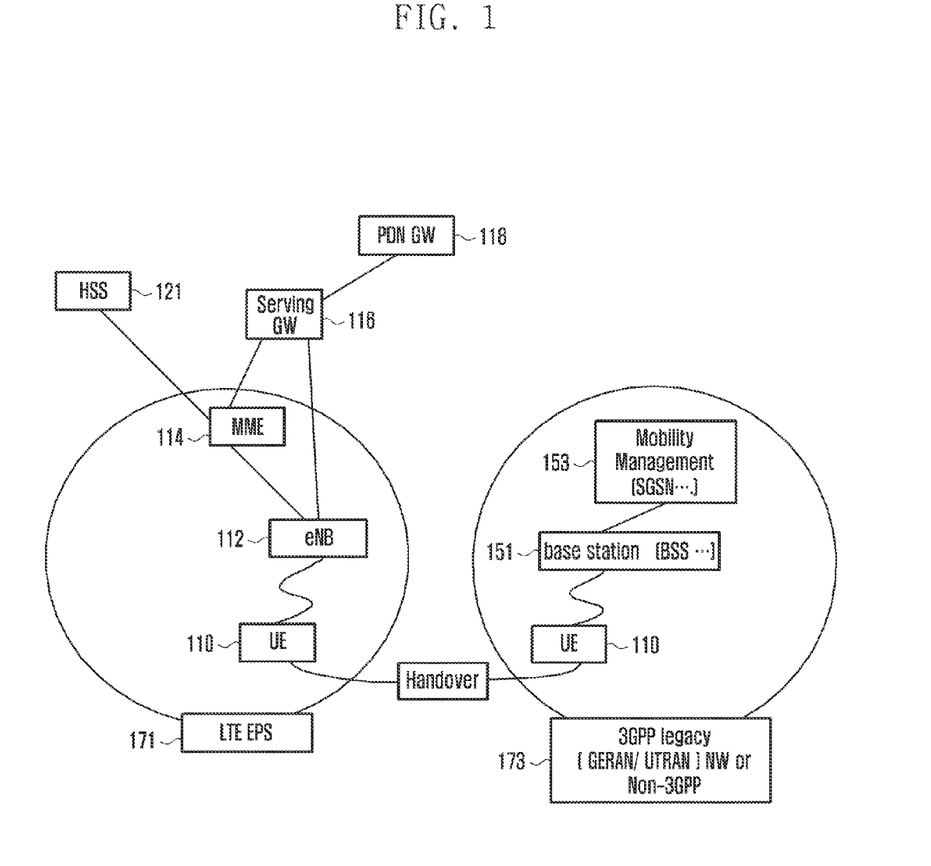
FIG. 1 is a diagram illustrating the environment supporting the emergency service in the mobile communication system according to an embodiment of the present invention.

As shown in FIG. 1, the embodiment of FIG. 1 proposes the method for supporting the emergency call service using the NAS protocol between UE and MME, and this method can be applied to other mobile communication systems having the similar technical background and channel format, with slight modification, without departing from the spirit and scope of the present invention by those skilled in the art.

FIG. 1 is a diagram illustrating the environment supporting the emergency service in the mobile communication system according to an embodiment of the present invention. Depicted herein is a exemplary system architecture of 3GPP EPS.

Referring to FIG. 1, the Evolved Node Base Station (E Node B or eNB) 112 establishes a radio connection to communicate with the User Equipment (UE) 110 located within the service area of the eNB 112. The UE 110 is the terminal connected to the packet data network such as Internet via the Serving Gateway (Serving GW or SGW). In the present invention, the Packet Data Network Gateway (PDN GW) 118 is responsible for the role of a Home Agent (HA) as an important network entity of the packet data network. The Mobility Management Entity (MME) 114 is responsible for mobility management, location management, and registration management. The Home Subscriber Server (HSS) 121 is connected to the MME 114 via an interface to manage the user and UE authentication information and the service information.

There are data paths and control interface for managing the UE's mobility between the eNB 112 and SGW 116 and between the MME 114 and SGW 116. In the present invention, the UE 110 and the MME 114 have the NAS protocol stack to communicate for mobility management, location management, and session management.

In the present invention, the description is focused on emergency call service based on the NAS protocol between the UE and MME introduced for mobility management, location management, and session management of the UE. A description is made of the method for supporting the emergency call service based on the NAS protocol between UE 110 and MME 114 with reference to the above described network with reference to FIGS. 2 to 8.

In order to explain the method for processing the emergency call in the middle of a handover from the 3GPP EPS network 171 to a legacy 3GPP network or non-3GPP network 173, the legacy 3GPP network or the non-3GPP network 173 such 3GPP CDMA2000 1× represented by GERAN and UTRAN is added to the EPS network architecture. The UE 110 can make a handover to receive the service from the network 173, and the base station 151 and mobility manager 153 are mentioned as the names of the entities defined in the corresponding network, e.g. BSS and SGSN.

Figure 2:
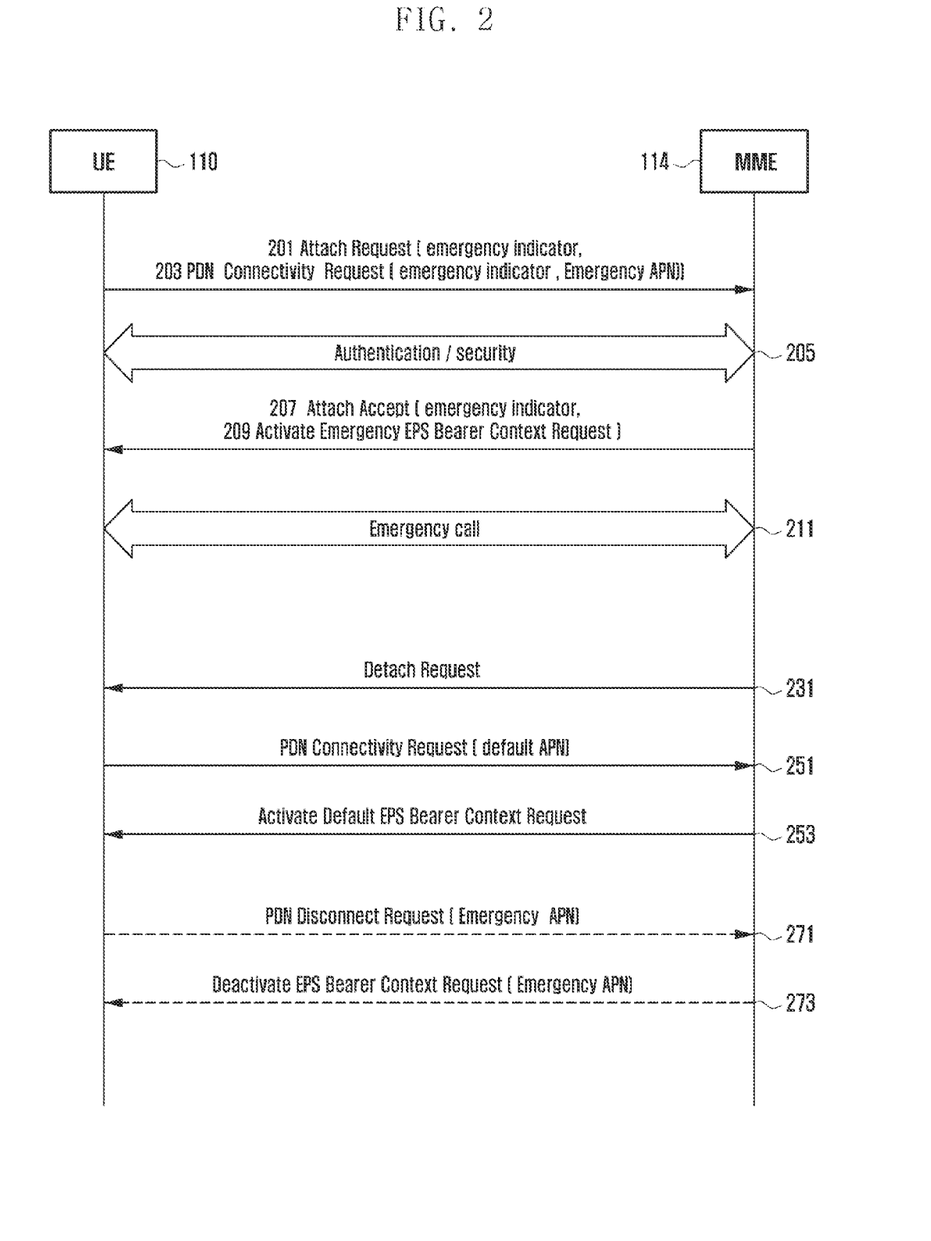
FIG. 2 is a message flow diagram illustrating a registration procedure for the emergency call and other normal services according to an embodiment of the present invention.

FIG. 2 is a message flow diagram illustrating a registration procedure for the emergency call and other normal services according to an embodiment of the present invention.

As depicted in FIG. 2, the procedure for registering the emergency call and other normal services is of the case where the normal service is processed after processing the firstly requested emergency call or the emergency call requested along with the normal service simultaneously is processed prior to the normal service. This procedure is described in comparison with the conventional method with reference to tables 1 to 14. In the emergency call and normal service registration procedure of the present invention, the UE 110 and the MME 114 operate as important entities as shown in FIG. 2.

The UE 110 sends the MME 114 an ATTACH REQUEST message at step 201. The ATTACH REQUEST message can include a Packet Data Network (PDN) Connectivity Request (PDN CONNECTIVITY REQUEST) message. The ATTACH REQUEST message also can include an emergency call indicator for notifying that the attach request is of the emergency call. The emergency call indicator can be formatted as a separate Information Element (IE) as shown in table 1.

Table 1 shows the format of the emergency call indicator IE transmitted in the ATTACH REQUEST message or the PDN CONNECTIVITY REQUEST message in order to indicate the emergency call.

TABLE 1

| 8 | 7 | 6 | 5 | 4 | 3 | 2 | 1 | |
|---|---|---|---|---|---|---|---|---|
| Emergency Call Indicator IEI | | | | Emergency Call Indicator value | | | | octet 1 |

The emergency call indicator IE can be set to a value having the meanings listed in table 2.

TABLE 2

| Emergency Call Indicator value [octet 1] Emergency Call Indicator value | | | | |
|---|---|---|---|---|
| Bits | | | | |
| 4 | 3 | 2 | 1 | |
| 0 | 0 | 0 | 0 | normal request |
| 0 | 0 | 0 | 1 | Emergency request |

All other values are reserved.

In this case, the ATTACH REQUEST message can be modified as shown in table 3. Also, the ATTACH REQUEST message having an attach type (hereinafter, referred to as Eps attach type) for indicating the emergency call, as shown in table 4, can be transmitted.

Table 3 shows the message content when the ATTACH REQUEST message includes the emergency call indicator of table 1.

TABLE 3

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type 9.9.3.11 | M | V | ½ |
| | NAS key set identifier | NAS key set identifier 9.9.3.21 | M | V | ½ |
| | Old GUTI or IMSI | EPS mobile identity 9.9.3.12 | M | LV | 5-12 |
| | UE network capability | UE network capability 9.9.3.34 | M | LV | 3-14 |
| | ESM message container | ESM message container 9.9.3.15 | M | LV-E | 2-n |
| | Emergency Call Indicator | Emergency call Indicator | M | V | ½ |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |

TABLE 3-continued

| IEI | Information Element | Type/Reference | Presence | Format | Length |
|---|---|---|---|---|---|
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |

Table 4 shows the format of EPS Attach type IE when the emergency call indicator indicating the emergency call in the ATTACH REQUEST message is included in the EPS Attach type IE.

TABLE 4

| 8 | 7 | 6 | 5 | 4 | 3 | 2 | 1 | |
|---|---|---|---|---|---|---|---|---|
| EPS attach type IEI | | | | 0 Spare | EPS attach type value | | | octet 1 |

The meaning of EPS attach type value can be defined as shown in table 5.

TABLE 5

| EPS attach type value [octet 1] | | | |
|---|---|---|---|
| Bits | | | |
| 3 | 2 | 1 | |
| 0 | 0 | 1 | EPS attach |
| 0 | 1 | 0 | combined EPS/IMSI attach |

TABLE 5-continued

| EPS attach type value [octet 1] | | | |
|---|---|---|---|
| Bits | | | |
| 3 | 2 | 1 | |
| 1 | 1 | 0 | Emergency requested attach |
| 1 | 1 | 1 | Reserved |

All other values are unused and shall be interpreted as "EPS attach". If received by the network.
Bit 4 of octet 1 is spare and shall be coded as zero.

Also, the PDN CONNECTIVITY REQUEST message can include the emergency call indicator for emergency call bearer setup request as a separate information element as shown in table 1 and, in this case, the PDN CONNECTIVITY REQUEST message can be modified as shown in table 6.

Table 6 shows the message contents when the emergency call indicator of table 1 is included in the PDN CONNECTIVITY REQUEST message.

TABLE 6

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | PDN connectivity request message identity | Message type 9.8 | M | V | 1 |
| | Request type | Request type 9.9.4.14 | M | V | ½ |
| | PDN type | PDN type 9.9.4.10 | M | V | ½ |
| | Emergency call indicator | Emergency call Indicator | M | V | ½ |
| D- | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |

The emergency call can be identified by the request type of the PDN CONNECTIVITY REQUEST message as shown in table 7.

Table 7 shows the format of the request type IE carrying the emergency call indicator for indicating the emergency call in the PDN CONNECTIVITY REQUEST message.

TABLE 7

| 8 | 7 | 6 | 5 | 4 | 3 | 2 | 1 | |
|---|---|---|---|---|---|---|---|---|
| Request type IEI | | | | 0 Spare | Request type value | | | octet 1 |

The request type value in table 7 can have the meanings as shown in table 8.

TABLE 8

| Request type value [octet 1] | | | |
|---|---|---|---|
| Bits | | | |
| 3 | 2 | 1 | |
| 0 | 0 | 1 | initial request |
| 0 | 1 | 0 | Handover |
| 0 | 1 | 1 | Emergency requested |
| 1 | 0 | 0 | Emergency handover |

All other values are unused and shall be interpreted as "initial request". If received by the network.
Bit 4 or octet 1 is spare and shall be coded as zero.

Meanwhile, in order to inform of the gateway supporting the emergency call service, the emergency Access Point Name (APN) can be indicated by means of an APN field in the legacy PDN CONNECTIVITY REQUEST message.

In this case, since the ATTACH REQUEST message, as the legacy initial attach message, does not use the APN field value, it is necessary to modify such that the APN field is added to the PDN CONNECTIVITY REQEUST message along with the ATTACH REQEUST only when the emergency call indicator exists. In case of indicating the request type of emergency call using an Emergency APN defined as shown in table 9 with a new field, the PDN CONNECTIVITY REQUEST message as shown in table 10 can be transmitted.

Table 9 shows the format of APN IE used to indicate the emergency APN. The APN IE format of table 9 is identical with that of the legacy APN IE except that the value can be set to emergency APN.

TABLE 9

| 8 | 7 | 6 | 5 | 4 | 3 | 2 | 1 | |
|---|---|---|---|---|---|---|---|---|
| Access point name IEI | | | | | | | | octet 1 |
| Length of access point name contents | | | | | | | | octet 2 |
| Access point name value | | | | | | | | octet 3 |
| | | | | | | | | octet n |

Table 10 shows the message content in case of applying the APN IE format of table 9 which indicates the modified request type of table 7 and the emergency APN to the PDN CONNECTIVITY REQUEST message.

TABLE 10

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | PDN connectivity request message identity | Message type 9.8 | M | V | 1 |
| | Request type | Request type 9.9.4.14 | M | V | ½ |
| | PDN type | PDN type 9.9.4.10 | M | V | ½ |
| | Emergency APN | APN | O | LV | 2-101 |
| D- | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |

When transmitting the message as shown in table 10, the emergency APN filed is set to the value indicating the emergency call, while the APN field is remained empty to instruct activation of default bearer in the initial ATTACH REQUEST such that the MME 114 regards the initial ATTACH REQUEST message with emergency call indicator, APN field empty, and configured emergency APN field as the registration request for emergency call.

Afterward, the authentication and security process is performed between the UE 110 and MME 114 at step 205. Since the emergency call should be supported even when the authentication and security process fails, the UEs succeeded and failed in the authentication and security process can be treated differently.

Next, the MME 114 sends the UE 110 an ATTACH ACCEPT message along with an EPS bearer activation request (ACTIVE EMERGENCY EPS BEARER CONTEXT REQUEST) message at step 207. The ACTIVE EMERGENCY EPS BEARER CONTEXT REQUEST message can be formatted as shown in table 11.

Table 11 shows the content of the ACTIVATE EMERGENCY EPS BEARER CONTEXT REQUEST MESSAGE. This message is newly proposed in the present invention to generate and activate an emergency bearer.

TABLE 11

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Activate Emergency EPS bearer context request message identity | Message type 9.8 | M | V | 1 |
| | EPS QoS | EPS quality of service 9.9.4.3 | M | LV | 2-10 |
| | Access point name | Access point name 9.9.4.1 | M | LV | 2-101 |
| | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-18 |
| 32 | Negotiated LLC SAPI | LLC service access piont identifier 9.9.4.7 | O | TV | 2 |
| 8- | Radio priority | Radio priority 9.9.4.13 | O | TV | 1 |
| 34 | Packet flow identifier | Packed flow identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |
| 27 | Protocol configuration options | Protocol configuration options 9.9.4.11 | O | TLV | 3-253 |

The EPS attach result included in the ATTACH ACCEPT message transmitted at step 207 can be modified as shown in table 112 in order to notify of the success of the emergency attach.

Table 12 shows the format of the EPS attach result IE included including the emergency call indicator to indicate the ATTACH ACCEPT message is of emergency call.

TABLE 12

| 8 | 7 | 6 | 5 | 4 | 3 | 2 | 1 | |
|---|---|---|---|---|---|---|---|---|
| EPS attach result IEI | | | | 0 Spare | EPS attach result value | | | octet 1 |

The EPS attach result IE can have the values as shown in table 13.

TABLE 13

| EPS attach result value [actet 1] | | | |
|---|---|---|---|
| Bits | | | |
| 3 | 2 | 1 | |
| 0 | 0 | 1 | EPS only |
| 0 | 1 | 0 | combined EPS/IMSI attach |
| 1 | 1 | 0 | Emergency Requested attach |

All other values are reserved.
Bit 4 of octet 1 is spare and shall be coded as zero.

Afterward, the emergency call service is provided at step 211.

If the emergency call service is terminated, the procedure can be continued in two ways, i.e. to step 231 or steps 251, 253, 271, and 273.

When the UE 110 has failed authentication, the procedure goes to step 231 at which the UE 110 sends the eNB 114 a DETACH REQUEST message such that the UE's registration is released after the termination of the emergency call service.

When the UE 110 has succeeded both the emergency call registration and authentication, the UE 110 sends the MME 114 a PDN CONNECTIVITY REQUEST message having the APN field set to default APN to establish a default bearer for EPS service at step 251. In response to the PDN CONNECTIVITY REQUEST message, the MME 114 sends the UE 110 an ACTIVATE DEFAULT EPS BEARER CONTEXT REQUEST message at step 253.

In case that the authentication has been successful in the urgent call registration process such that steps 251 and 253 have been performed, it is possible to deactivate the emergency call bearer to support other normal service more efficiently at steps 271 and 273 which can be skipped in an embodiment directed to the case where the emergency call bearer is maintained in active state. The UE 110 sends the MME 114 a PDN DISCONNECT REQUEST message at step 271. The PDN DISCONNECT REQUEST MESSAGE can include the emergency APN. In response to the PDN DISCONNECT REQUEST message, the MME 114 sends the UE 110 an EPS bearer context deactivate request (DEACTIVATE EPS BEARER CONTEXT REQUEST) message at step 273.

Figure 3:
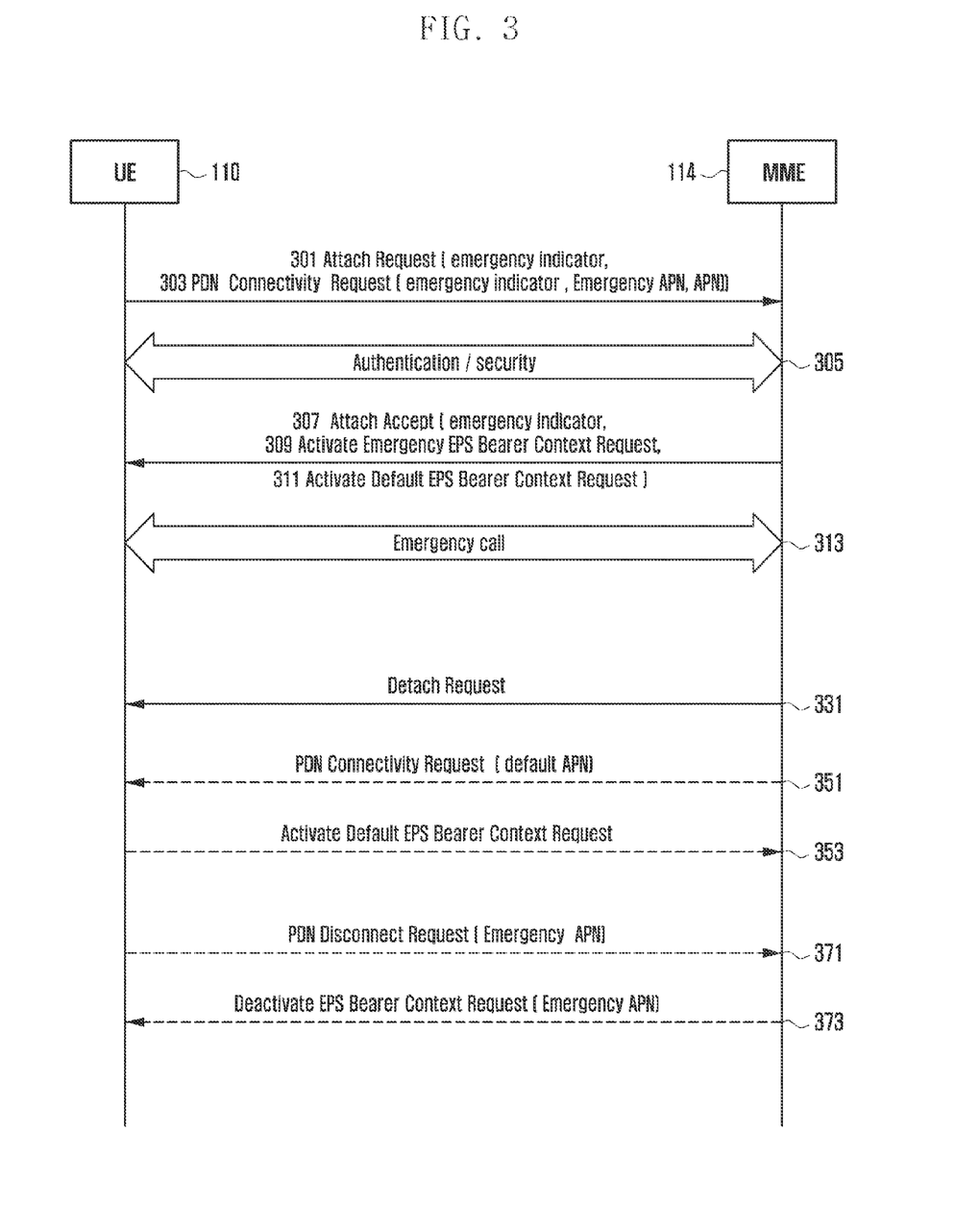
FIG. 3 is a message flow diagram illustrating a registration procedure for the emergency call and other normal services according to another embodiment of the present invention.

FIG. 3 is a message flow diagram illustrating a registration procedure for the emergency call and other normal services according to another embodiment of the present invention.

As depicted in FIG. 3, the procedure for registering the emergency call and other normal services is of the case where bearers for both the emergency call and other normal services are established in response to the emergency call request. The difference from the conventional technique in procedure is described with reference to message formats of tables 1 to 14. In the procedure for registering the emergency call service along with other normal services, the UE 110 and the MME 114 are the important entities as shown in FIG. 3.

The UE 110 sends the MME 114 an ATTACH REQUEST message including the Packet Data Network Connectivity Request (PDN CONNECTIVITY REQUEST) message of step 303 at step 301. The ATTACH REQUEST message includes an emergency call indicator to indicate the emergency call request. The emergency call indicator can be provided in the form of a separate IE as shown in table 1 and, in this case, the ATTACH REQUEST message can be modified as shown in table 3. Also, the ATTACH REQUEST message having an attach type (hereinafter, referred to as Eps attach type) for indicating the emergency call, as shown in table 4, can be transmitted.

Also, the PDN CONNECTIVITY REQUEST message can include the emergency call indicator for emergency call bearer setup request as a separate information element as shown in table 1. The request type of the PND CONNECTIVITY REQUEST message can be set to notify of the emergency call as shown in table 7. Meanwhile, an Access Point Name (APN) should be set to notify the MME 114 of the gateway supporting the emergency call service. In case of defining the emergency APN with the definition of a new field and notifying of the emergency with the request type as shown in table 7, the PDN CONNECTIVITY REQUEST message can be transmitted in the format as shown in table 10. In the message as shown in table 10, the emergency APN field is set to APN while the APN field is remained empty to instruct activation of default bearer in the initial ATTACH REQUEST such that the MME 114 regards the initial ATTACH REQUEST message with emergency call indicator, APN field empty, and configured emergency APN field as the registration request for emergency call with the emergency APN and normal service with the default APN. When using the separate emergency call indicator as shown in table 1 to notify the MME 114 of the APN, the PDN CONNECTIVITY REQUEST message having the APN filed empty and the emergency APN field set to APN, as shown in table 14, is transmitted.

Table 14 shows the message content when the PDN CONNECTIVITY REQUEST message includes the emergency call indicator of table 1 and the emergency APN of table 9.

TABLE 14

| IEI | Information Element | Type/Reference | Presence | Format | Length |
|---|---|---|---|---|---|
| | Protocol discriminator | Protocol discriminator 9.2 | M | V | ½ |

TABLE 14-continued

| IEI | Information Element | Type/Reference | Presence | Format | Length |
|---|---|---|---|---|---|
| | EPS bearer identity | EPS bearer identity 9.3.2 | M | V | ½ |
| | Procedure transanction identity | Procedure transaction identity 9.4 | M | V | 1 |
| | PDN connectivity request message identity | Message type 9.6 | M | V | 1 |
| | Request type | Request type 9.9.4.14 | M | V | ½ |
| | PDN type | PDN type 9.9.4.10 | M | V | ½ |
| | Emergency call indicator | Emergency call indicator | M | V | ½ |
| | Emergency APN | APN | O | LV | 2-101 |
| D- | ESM information transfer flag | ESM information transfer flag 9.9.4.5 | O | TV | 1 |
| 28 | Access point name | Access piont name 9.9.4.1 | O | TLV | 3-102 |
| 27 | Protocol configuration options | Protocol configuration options 9.9.4.11 | O | TLV | 3-253 |

Afterward, the authentication and security process is performed between the UE 110 and MME 114 at step 305. Since the emergency call should be supported even when the authentication and security process fails, the UEs succeeded and failed in the authentication and security process can be treated differently. Next, the MME 114 sends the UE 110 an ATTACH ACCEPT message along with an EPS bearer activation request (ACTIVE EMERGENCY EPS BEARER CONTEXT REQUEST) message and a default EPS bearer activation request (ACTIVATE DEFAULT EPS BEARER CONTEXT REQUEST) message at step 307. Here, the EPS attach result included in the ATTACH ACCEPT message can be modified to inform of the successful emergency attach result as shown in table 12. Next, the emergency call service is provided at step 313. Afterward, if the emergency call service is terminated the procedure can be continued in two ways, i.e., to step 331 or steps 351, 353, 371, and 373.

When the UE 110 has failed authentication, the procedure goes to step 331 at which the UE 110 sends the eNB 114 a DETACH REQUEST message such that the UE's registration is released after the termination of the emergency call service.

When the UE 110 has succeeded both the emergency call registration and authentication but no default bearer for the EPS service is established, the UE 110 sends the MME 114 a PDN CONNECTIVITY REQUEST message having the APN field set to default APN to establish a default bearer for EPS service at step 371. In response to the PDN CONNECTIVITY REQUEST message, the MME 114 sends the UE 110 an ACTIVATE DEFAULT EPS BEARER CONTEXT REQUEST message at step 373. In case that the authentication has been successful in the urgent call registration process such that steps 351 and 353 have been performed, it is possible to deactivate the emergency cal bearer to support other normal service more efficiently at steps 351 and 353 which can be skipped in an embodiment directed to the case where the emergency call bearer is maintained in active state. The UE 110 sends the MME 114 a PDN DISCONNECT REQUEST message including the APN field set to emergency APN at step 351. In response to the PDN DISCONNECT REQUEST message, the MME 114 sends the UE 110 an EPS bearer context deactivate request (DEACTIVATE EPS BEARER CONTEXT REQUEST) message at step 353.

Figure 4:
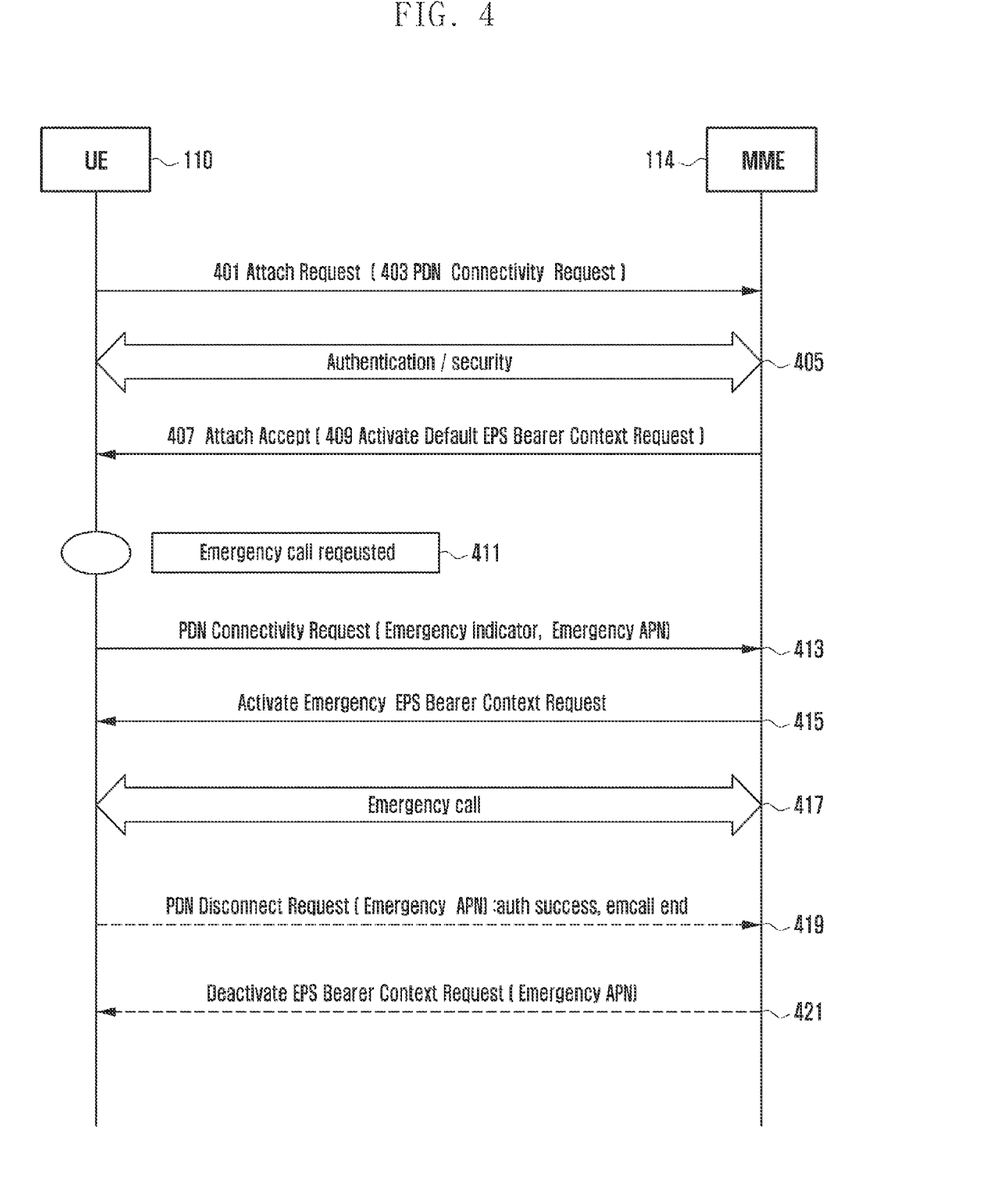
FIG. 4 is a message flow diagram illustrating a registration procedure for the emergency call and other normal services according to another embodiment of the present invention.

FIG. 4 is a message flow diagram illustrating a registration procedure for the emergency call and other normal services according to another embodiment of the present invention. As depicted in FIG. 4, the procedure for registering the emergency call and other normal services is of the case where the emergency call service request follows the normal service request. The difference from the conventional technique in procedure is described with reference to message formats of tables 1 to 14. In the procedure for registering the emergency call and normal services, the UE 110 and the MME 114 are the important entities as shown in FIG. 4.

The UE 110 sends the MME 114 an ATTACH REQUEST message including a Packet Data Network Connectivity Request (PDN CONNECTIVITY REQUEST) message at step 401. Afterward, the authentication and security process is performed between the UE 110 and the MME 114 at step 405. The MME 114 can send the UE 110 an ATTACH ACCEPT message including a default EPS bearer context request (ACTIVATE DEFAULT EPS BEARER CONTEXT REQUEST) message at step 407. Next, if an emergency call is placed at step 411, the UE 110 sends the MME 114 a PDN CONNECTIVITY REQUEST message, as shown in table 6, which is modified with the emergency call indicator in the form of a separate IE as shown in table 1 to request for the bearer setup of emergency call at step 413. The PDN CONNECTIVITY REQUEST message can include the request type to notify of the emergency call as shown in table 7.

The conventional PDN CONNECTIVITY REQUEST message can used with addition of the APN field to inform of the gateway supporting the emergency call service. In this case, since the APN value is requested for default bearer in the conventional method, if the emergency call indicator as shown in table 1 exists or if the emergency call indicator is included in the request type as shown in table 7, the PDN CONNECTIVITY REQUEST message should be modified in order for the APN field to carry the emergency call APN and the conventional default APN selectively.

In case of indicating the emergency call by defining the emergency APN and setting the request type to emergency APN as shown in table 9, the PDN CONNECTIVITY REQUEST message formatted as shown in table 10 can be transmitted. In the message as shown in table 10, the Emergency APN field is set to APN for emergency call and, if the emergency call indicator is in the request type and the Emergency APN is set, the MME 114 regards the message as the registration request for emergency call. In case that the emergency call indicator as shown in table 1 is used with the emergency APN defined separately as shown in table 9, the message format as shown in table 14 is used.

The UE 110 sends the MME 114 an emergency EPS bearer context activation request (ACTIVATE EMERGENCY EPS BEARER CONTEXT REQUEST) message at step 415. The ACTIVATE EMERGENCY EPS BEARER CONTEXT REQUEST message is a newly defined message in the format of table 11. Afterward, the emergency call process is performed at step 417. Once the emergency call service is terminated, the emergency call service bearer can be released for supporting other normal service more efficiently or for other purpose through steps 419 and 421, which can be skipped. The UE 110 sends the MME 114 a PDN connection release request (PDN DISCONNECT REQUEST) message including the emergency APN at step 419. In response to the PDN DISCONNECT REQUEST message, the MME 114 sends the UE 110 an EPS bearer context deactivation request (DEACTIVATE EPS BEARER CONTEXT REQUEST) message including the Emergency APN at step 421.

Figure 5:
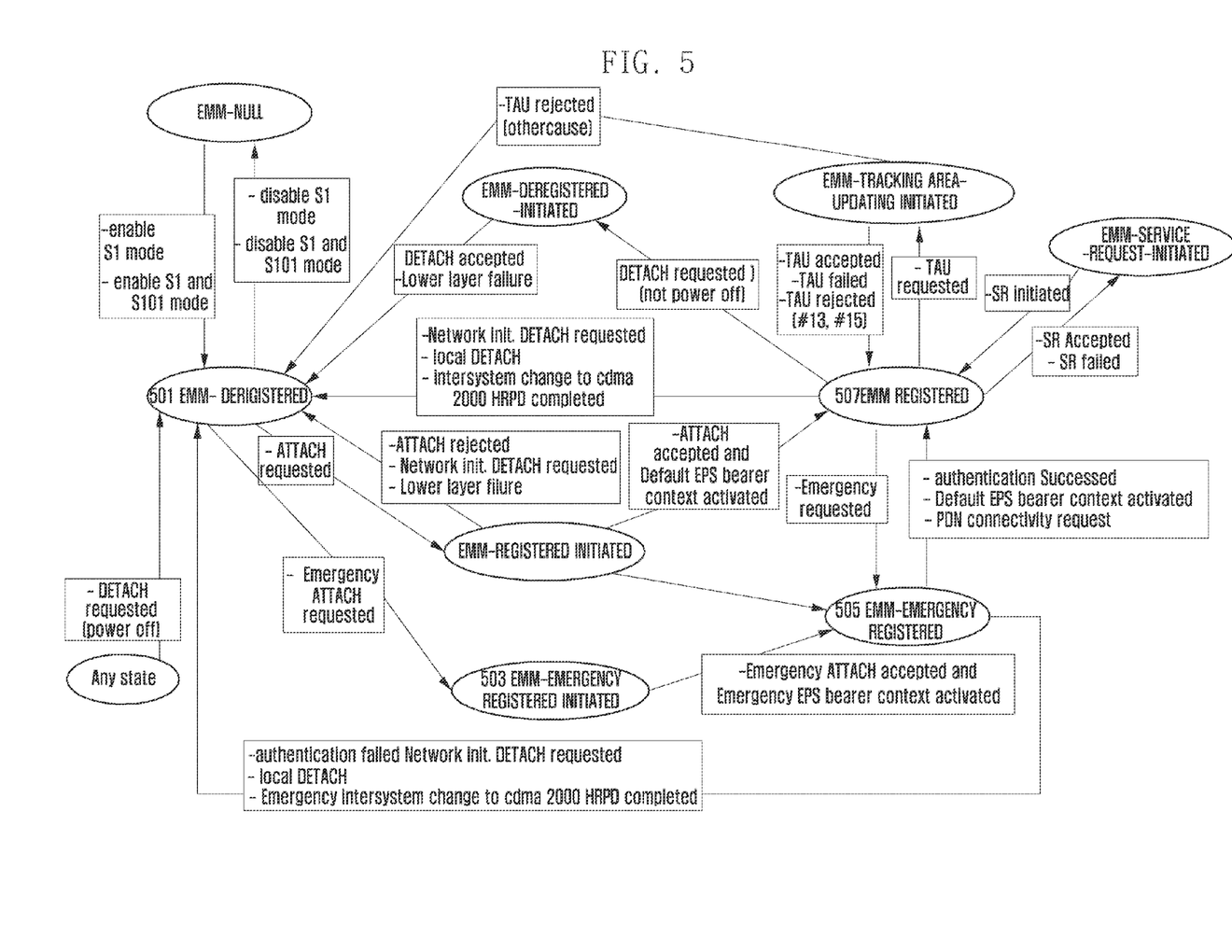
FIG. 5 is a state transition diagram illustrating the state transition of the UE for supporting the emergency call service according to an embodiment of the preset invention.

FIG. 5 is a state transition diagram illustrating the state transition of the UE for supporting the emergency call service according to an embodiment of the preset invention. FIG. 5 shows exemplary UE operations where the UE executes the emergency call and normal service access processes separately.

In FIG. 5, if the emergency attach is requested in the EMM-DEREGISTERED state 505, the state transitions to the EMM-EMERGENCY REGISTERED INITIATED state 503. If the state transitions from the EMM-EMERGENCY REGISTERED INITIATED state 503 to the EMM-EMERGENCY REGISTERED state 505, this means that the emergency attach has been accepted and the emergency EPS bearer context has been successfully activated. Meanwhile, if the state transitions from the EMM-EMERGENCY REGISTERED state 505 to the EMM REGISTERED state, this means that the authentication has been successful in the ATTACH process or the authentication process has been initiated and succeeded, and the PDN connection should be established for the default EPS bearer context activation. Meanwhile, if the authentication process has failed in the ATTACH process after the termination of the emergency call in the EMM-EMERGENCY REGISTERED state 505 or if the local DETACH or emergency intersystem change to the CDMA2000 HRPD has been terminated, the state transitions to the EMM-DEREGISTERED state 501. If an emergency call is placed in the EMM REGISTERED state 507, the state can transition to the EMM-EMERGENCY REGISTERED state 505.

Figure 6:
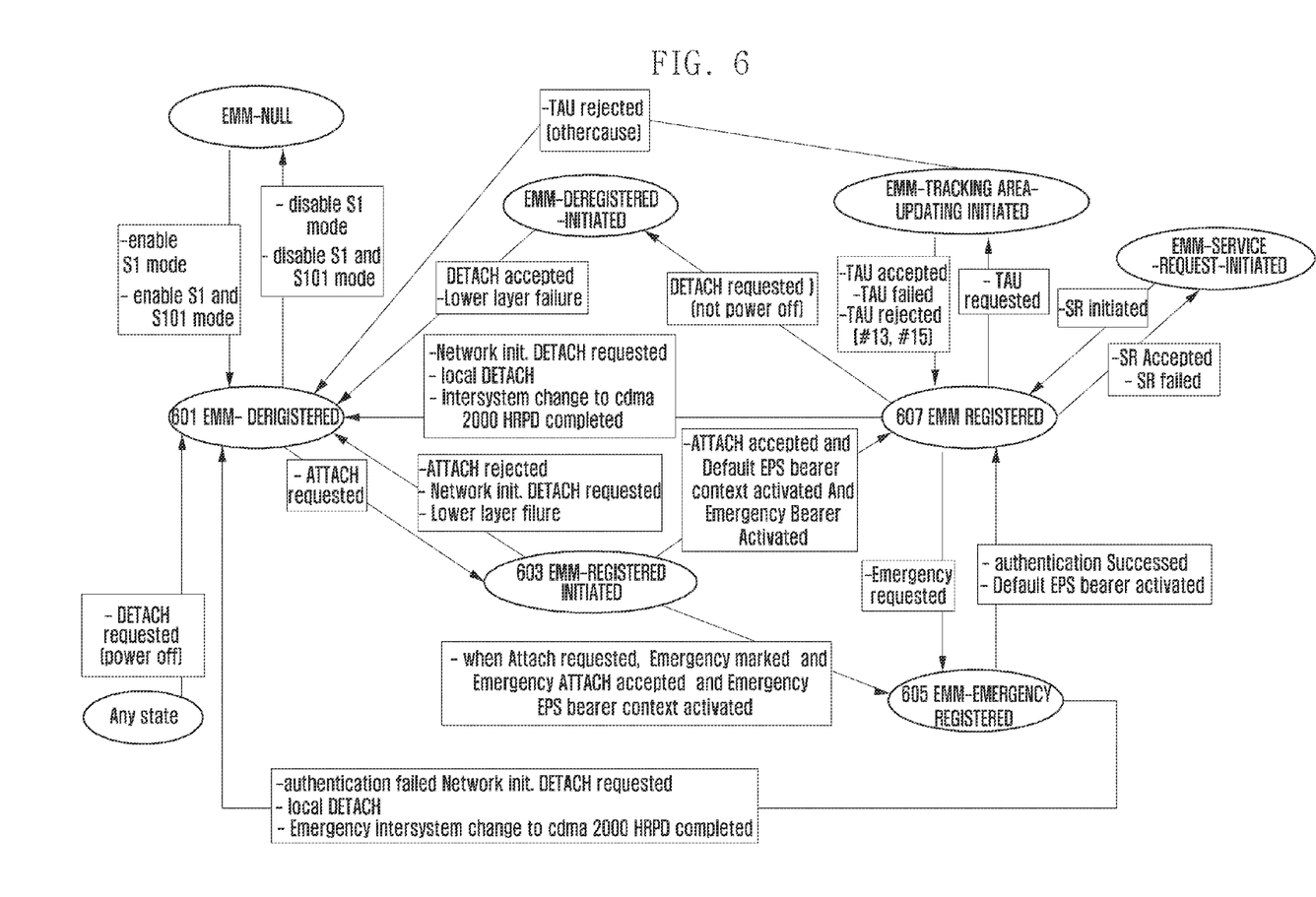
FIG. 6 is a state transition diagram illustrating the state transition of the UE supporting the emergency call service according to another embodiment of the present invention.

FIG. 6 is a state transition diagram illustrating the state transition of the UE supporting the emergency call service according to another embodiment of the present invention. FIG. 6 shows exemplary UE operations when the UE executes the emergency call and normal service access processes integrally.

In FIG. 6, if the emergency attach is requested in the EMM-DEREGISTERED state 601, the state transitions to the EMM-REGISTERED INITIATED state 603. If the state has transitioned from the EMM-REGISTERED INITIATED state 603 to the EMM-EMERGENCY REGISTERED state 605, the emergency call should be marked in the attach request, the emergency attach should be accepted, and the emergency EPS bearer context should be activated. Meanwhile, if the state transitions from the EMM-EMERGENCY REGISTERED state 605 to the EMM REGISTERED state, this means that the authentication has succeed in the ATTACH process or the authentication process has been initiated and succeeded, and the EPS default bearer, which is not activated yet, is successfully activated by transmitting the PDN CONNECTIVITY REQUEST message. If the authentication fails in the ATTACH process after the termination of the emergency call in the EMM-EMERGENCY REGISTERED state 605 or the authentication performed after the termination of the emergency call fails, the state transitions to the EMM-DEREGISTERED state by the network-triggered DETACH request or according to the termination of the emergency intersystem change to the CDMA2000 HRPD. If the emergency call is requested in the EMM REGISTERED state 607, the state can transition to the EMM-EMERGENCY REGISTERED state 565.

Figure 7:
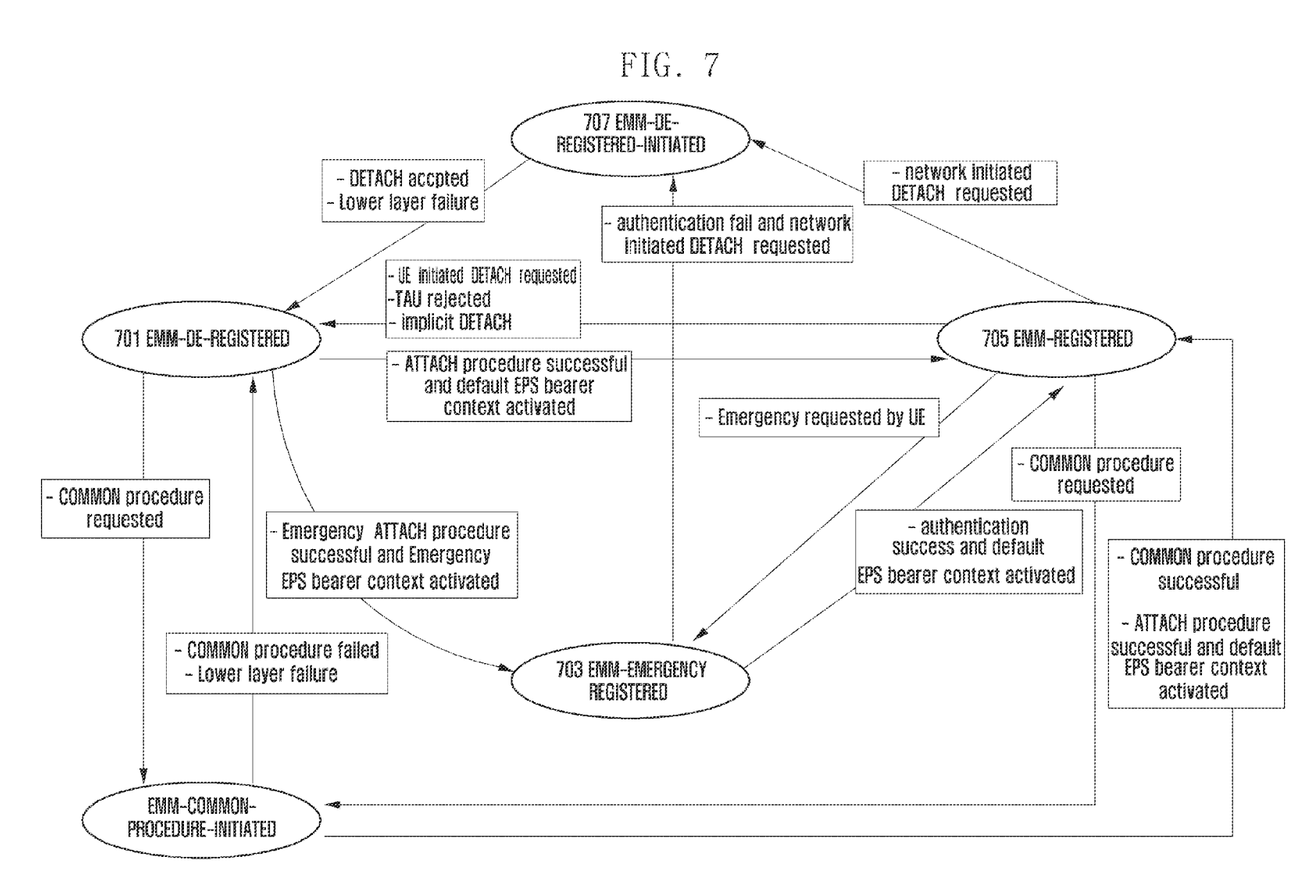
FIG. 7 is a state transition diagram illustrating the state transition of the MME supporting the emergency call service according to another embodiment of the present invention.

FIG. 7 is a state transition diagram illustrating the state transition of the MME supporting the emergency call service according to another embodiment of the present invention. FIG. 7 shows exemplary MME operations where the UE executes the emergency call and normal service access processes separately. The MME can operate in association with the UE of which state transitions as shown in FIG. 5.

If the emergency attach procedure is successful and the emergency EPS bearer is activated successfully in the EMM-DE-REGISTERED state 701, the state transitions to the EMM-EMERGENCY REGISTERED state 703. If the state transitions from the EMM-EMERGENCY REGISTERED state 703 to the EMM-REGISTERED state 705, this means that the authentication has succeeded in the ATTACH process or the authentication has succeeded in the attempt after the emergency call and then the default EPS bearer context has been successfully activated. When the emergency call is requested by the UE, the state can be transitioned from the EMM-REGISTERED state 703 to the EMM-EMERGENCY REGISTERED state 705. When the UE attempts to disconnect to the network after the execution of the emergency call in the state that the authentication has failed in the attach process, the state can be transitioned from the EMM-REGISTERED state 703 to the EMM-DEREGISTERED-INITIATED state with the transmission of the network triggered DETACH request message.

Figure 8:
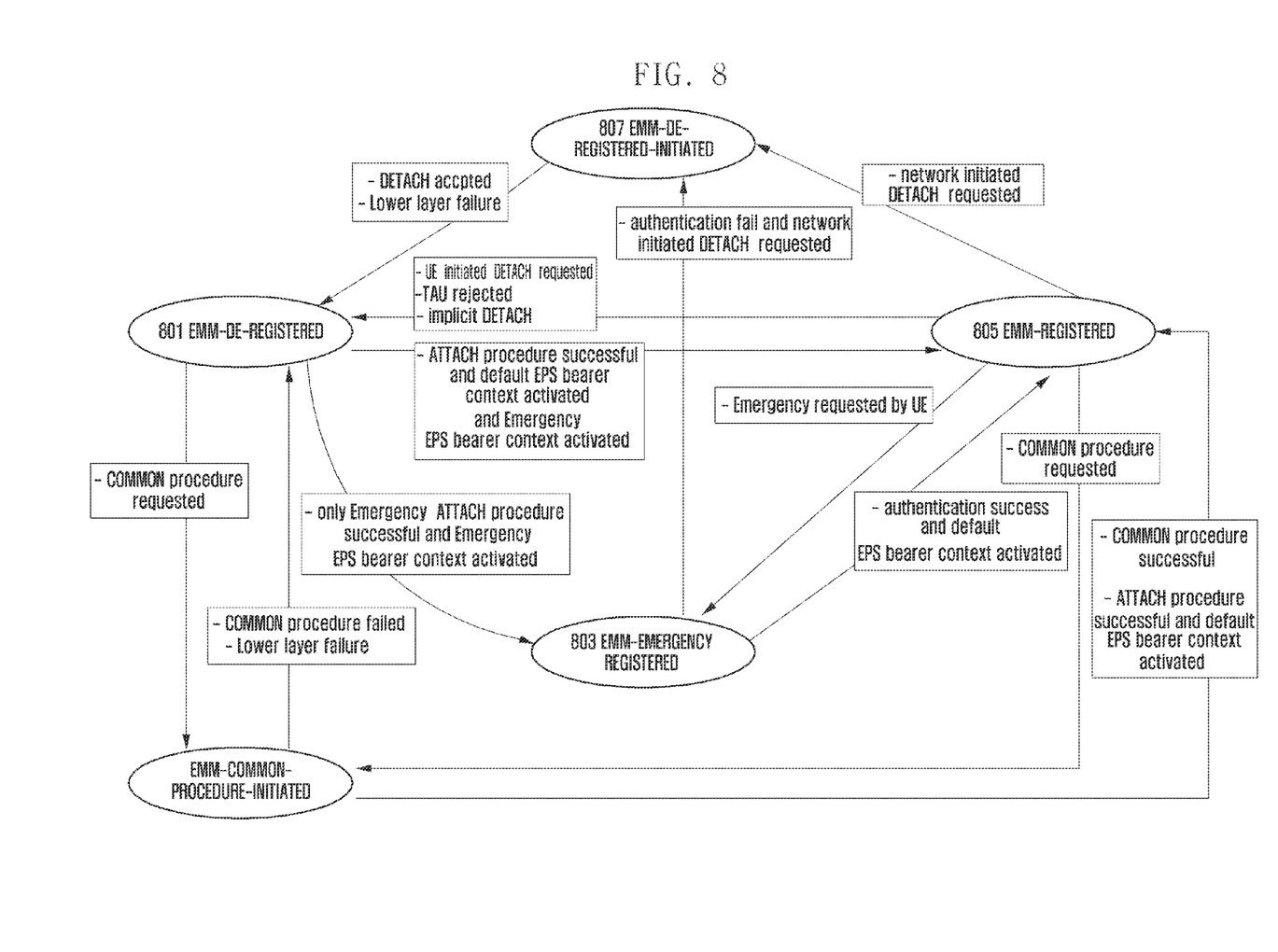
FIG. 8 is a state transition diagram illustrating the state transition of the MME supporting the emergency call service according to an embodiment of the present invention.

FIG. 8 is a state transition diagram illustrating the state transition of the MME supporting the emergency call service according to an embodiment of the present invention. FIG. 8 shows exemplary MME operations when the UE executes the emergency call and normal service accesses processes integrally.

If the normal access process fails after the success of the emergency attach procedure and the emergency bearer activation in the EMM-DE-REGISTERED state 801, the state transitions to the EMM-EMERGENCY REGISTERED state 803. If the state transitions from the EMM-EMERGENCY REGISTERED state 803 to the EMM-REGISTERED state 805, this means that the authentication has succeeded in the ATTACH process or the authentication and default EPS bearer context activation have succeeded in the attempt after the termination of the emergency call. If the state transitions from the EMM-REGISTERED state 805 to the EMM-EMERGENCY REGISTERED state 803, this means that the emergency call is requested by the UE. If the state transitions from the EMM-EMERGENCY-REGISTERED state 803 to the EMM-DEREGISTERED-INITIATED state 807, this means that the authentication has failed in the ATTACH procedure and the UE attempts to release the connection to the network with a network-initiated detach request message. If the state transitions from the EMM-DEREGISTERED state 801 to the EMM-REGISTERED state 805, this means that the ATTACH, default EPS bearer activation, and emergency call request marking processes have succeeded in series such that the emergency EPS bearer context has been activated successfully.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A method for providing an emergency call service at a terminal, the method comprising:
    transmitting an attach request message together with a first Packet Data Network (PDN) Connectivity Request message to a Mobility Management Entity (MME), the first PDN Connectivity Request message including a request type information element indicating that the terminal requests a connectivity to a PDN for an emergency bearer service;
    receiving an attach accept message including an emergency call indicator from the MME, the connectivity to the PDN for the emergency bearer service being established based on the emergency call indicator;
    transmitting a second PDN Connectivity Request message to the MME, the second PDN Connectivity Request message including a request type information element indicating that the terminal requests new connectivity to the PDN; and
    receiving an Activate Default Evolved Packet System (EPS) Bearer Context Request message from the MME in response to the second PDN Connectivity Request message,
    wherein the second PDN Connectivity Request message is transmitted without waiting for deactivation of the established connectivity to the PDN for the emergency bearer service.

2. The method of claim 1, wherein the attach accept message is received together with an Activate Emergency EPS Bearer Context Request message.

3. The method of claim 1, wherein the connectivity to the PDN for the emergency bearer service is established if the emergency call indicator indicates that the emergency bearer service is supported.

4. The method of claim 1, wherein the connectivity to the PDN for the emergency bearer service is not established if the emergency call indicator indicates that the emergency bearer service is not supported.

5. A method for providing an emergency call service at a Mobility Management Entity (MME), the method comprising:
    receiving an attach request message together with a first Packet Data Network (PDN) Connectivity Request message from a terminal, the first PDN Connectivity Request message including a request type information element indicating that the terminal requests a connectivity to a PDN for an emergency bearer service;
    transmitting an attach accept message including an emergency call indicator to the terminal, the connectivity to the PDN for the emergency bearer service being established based on the emergency call indicator;
    receiving a second PDN Connectivity Request message from the terminal, the second PDN Connectivity Request message including a request type information element indicating that the terminal requests new connectivity to the PDN; and
    transmitting an Activate Default Evolved Packet System (EPS) Bearer Context Request message to the terminal in response to the second PDN Connectivity Request message,
    wherein the second PDN Connectivity Request message is transmitted without waiting for deactivation of the established connectivity to the PDN for the emergency bearer service.

6. The method of claim 5, wherein the attach accept message is transmitted together with an Activate Emergency EPS Bearer Context Request message.

7. The method of claim 5, wherein the connectivity to the PDN for the emergency bearer service is established if the emergency call indicator indicates that the emergency bearer service is supported.

8. The method of claim 5, wherein the connectivity to the PDN for the emergency bearer service is not established if the emergency call indicator indicates that the emergency bearer service is not supported.

9. A terminal for providing an emergency call service, the terminal comprising:
    a transmitter configured to:
        transmit an attach request message together with a first Packet Data Network (PDN) Connectivity Request message to a Mobility Management Entity (MME), the first PDN Connectivity Request message including a request type information element indicating that the terminal requests a connectivity to a PDN for an emergency bearer service, and
        transmit a second PDN Connectivity Request message to the MME, the second PDN Connectivity Request message including a request type information element indicating that the terminal requests new connectivity to the PDN; and a receiver configured to:
receive an attach accept message including an emergency call indicator from the MME, the connectivity to the PDN for the emergency bearer service being established based on the emergency call indicator, and
receive an Activate Default Evolved Packet System (EPS) Bearer Context Request message from the MME in response to the second PDN Connectivity Request message,
wherein the second PDN Connectivity Request message is transmitted without waiting for deactivation of the established connectivity to the PDN for the emergency bearer service.

10. The terminal of claim 9, wherein the attach accept message is received together with an Activate Emergency EPS Bearer Context Request message.

11. The terminal of claim 9, wherein the connectivity to the PDN for the emergency bearer service is established if the emergency call indicator indicates that the emergency bearer service is supported.

12. The terminal of claim 9, wherein the connectivity to the PDN for the emergency bearer service is not established if the emergency call indicator indicates that the emergency bearer service is not supported.

13. A Mobility Management Entity (MME) for providing an emergency call service, the MME comprising:
a receiver configured to:
receive an attach request message together with a first Packet Data Network (PDN) Connectivity Request message from a terminal, the first PDN Connectivity Request message including a request type information element indicating that the terminal requests connectivity to a PDN for an emergency bearer service, and
receive a second PDN Connectivity Request message from the terminal, the second PDN Connectivity Request message including a request type information element indicating that the terminal requests new connectivity to the PDN; and
a transmitter configured to:
transmit an attach accept message including an emergency call indicator to the terminal, the connectivity to the PDN for the emergency bearer service being established based on the emergency call indicator, and
transmit an Activate Default Evolved Packet System (EPS) Bearer Context Request message to the terminal in response to the second PDN Connectivity Request message,
wherein the second PDN Connectivity Request message is transmitted without waiting for deactivation of the established connectivity to the PDN for the emergency bearer service.

14. The MME of claim 13, wherein the attach accept message is transmitted together with Activate Emergency EPS Bearer Context Request message.

15. The MME of claim 13, wherein the connectivity to the PDN for the emergency bearer service is established if the emergency call indicator indicates that the emergency bearer service is supported.

16. The MME of claim 13, wherein the connectivity to the PDN for the emergency bearer service is not established if the emergency call indicator indicates that the emergency bearer service is not supported.

* * * * *